United States Patent [19]

McCurry

[11] Patent Number: 5,191,921

[45] Date of Patent: Mar. 9, 1993

[54] ADJUSTABLE DEPTH OF CUT STOP MECHANISM FOR A PLUNGE TYPE ROUTER

[75] Inventor: Ronald C. McCurry, West Union, S.C.

[73] Assignee: Ryobi Motor Products Corp., Easley, S.C.

[21] Appl. No.: 779,074

[22] Filed: Oct. 18, 1991

[51] Int. Cl.⁵ .......................... B23C 1/20; B27C 5/10
[52] U.S. Cl. ........................... 144/134 D; 144/136 C; 408/241 S; 409/182; 409/210
[58] Field of Search ............... 409/175, 182, 204, 210, 409/218; 408/241 S; 144/134 R, 134 D, 136 C

[56] References Cited

U.S. PATENT DOCUMENTS

| | | | |
|---|---|---|---|
| 4,319,860 | 3/1982 | Beares | 144/136 C |
| 4,445,811 | 5/1984 | Sanders | 144/134 D |
| 4,566,830 | 1/1986 | Maier et al. | 144/136 C |
| 4,652,191 | 3/1987 | Bernier | 144/136 C |
| 4,770,573 | 9/1988 | Monobe | 408/241 S |
| 4,938,642 | 7/1990 | Imahashi et al. | 144/134 D |

Primary Examiner—W. Donald Bray
Attorney, Agent, or Firm—Brooks & Kushman

[57] ABSTRACT

A plunge type router including a mechanism for setting the depth of cut of the router. The mechanism is a compact and self-contained assembly which provides for fine adjustment, locking and quick release, all at a single location on the tool.

6 Claims, 4 Drawing Sheets

ADJUSTABLE DEPTH OF CUT STOP MECHANISM FOR A PLUNGE TYPE ROUTER

BACKGROUND OF THE INVENTION

This invention relates to plunge type routers and, more particularly, to a mechanism for setting the depth of cut of such a router.

Plunge type routers are similar to conventional routers in that they include a drive motor secured within a motor housing, the motor having a shaft which extends outwardly beyond the lower end of the motor housing, with the shaft adapted to have a cutting tool secured thereto. The router also includes a base plate which is displaceable substantially vertically relative to the motor housing. In conventional non-plunge type routers, the motor is locked in position relative to the base plate such that the cutting tool projects axially beyond the lower workpiece engaging surface of the base plate to the desired depth of cut at all times. On the other hand, plunge type routers provide biasing means which operate to retract the cutting tool above the workpiece engaging surface of the base plate during periods of non-use. In order to enable a plunge type router to be "plunged" to the desired cutting depth, such routers are also commonly provided with adjustable depth stop systems and may also include arrangements for locking the motor housing relative to the base plate at preselected positions, such as the cutting depth. It is a primary object of this invention to provide an adjustable depth stop mechanism for use with a plunge type router.

Such an adjustable depth stop mechanism should preferably include the features of being able to make fine adjustments, being able to lock the mechanism at the desired adjustment, and being able to quickly release the mechanism. It would also be desirable to provide all of these features in a compact self-contained mechanism so that the operator can quickly access the mechanism and utilize all its features without having to move from place to place on the tool. It is therefore another object of this invention to provide a compact adjustable depth stop mechanism for a router having these described features and advantages.

SUMMARY OF THE INVENTION

The foregoing, and additional, objects are attained in accordance with the principles of this arrangement by providing a plunge type router comprising a motor housing with a drive motor secured therein, the drive motor having a shaft extending outwardly from the lower end of the motor housing and adapted to have a cutting tool secured thereto, a base plate displaceable substantially vertically relative the motor housing, means for guiding the displacement of the base plate relative the motor housing, abutment means mounted on the base plate, and depth stop means mounted on the motor housing for cooperating with the abutment means to limit the relative displacement of the base plate toward the motor housing, the depth stop means including a stop bar, means for supporting the stop bar on the motor housing for vertical displacement in interfering relationship with the abutment means, a toothed rack on the stop bar, a pinion gear, means for selectively engaging and disengaging the rack and the pinion gear, means for rotating the pinion gear to adjust the vertical displacement of the stop bar when the rack and the pinion gear are engaged, and lock means associated with the rotating means for selectively locking the stop bar in a desired position on the motor housing.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

Figure 1:
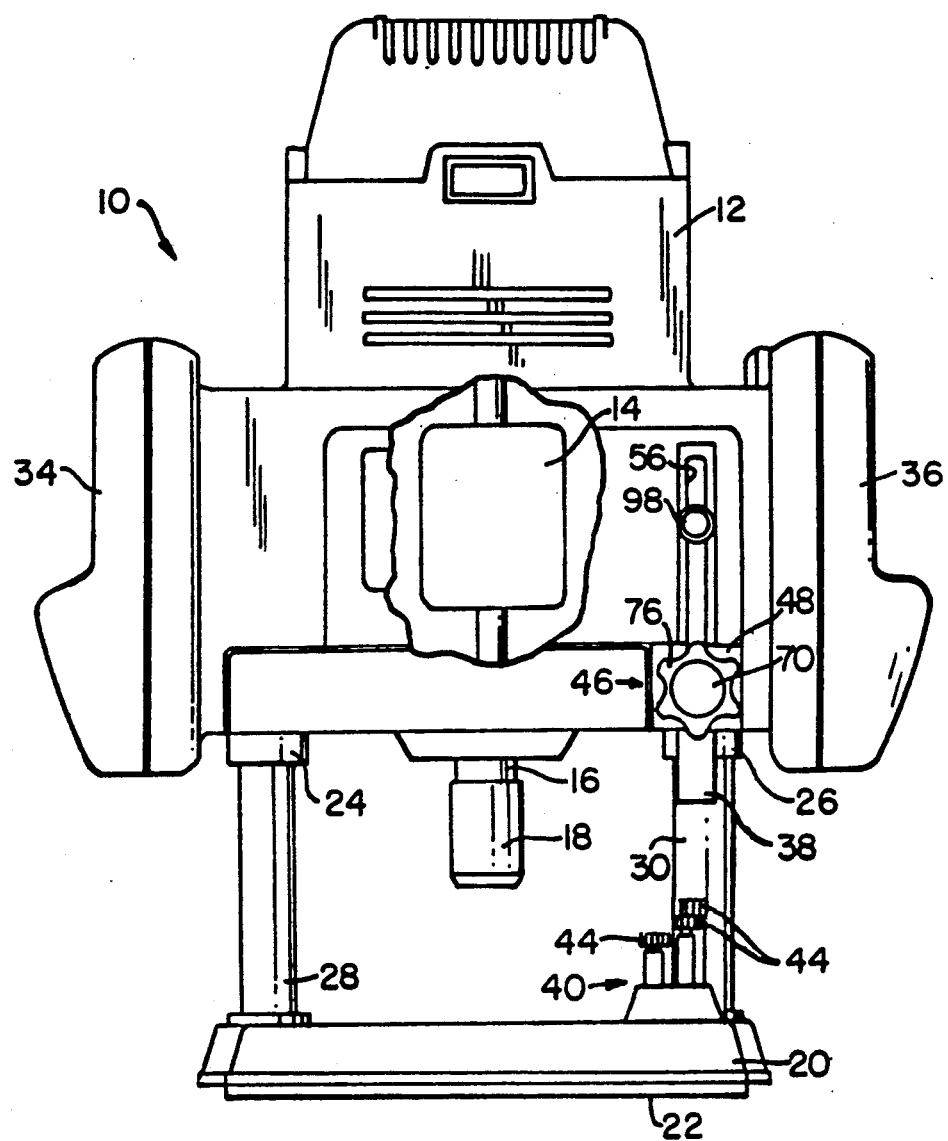
FIG. 1 is a front elevational view of a plunge type router having an adjustable depth stop mechanism constructed in accordance with the principles of this invention.

Referring now to the drawings, there is illustrated a plunge type router, designated generally by the reference numeral 10, incorporating an adjustable depth stop mechanism constructed according to this invention. The router 10 includes a motor housing 12 in which a drive motor 14 is secured, in a conventional manner. The motor 14 has a shaft 16 which extends outwardly from the lower end of the motor housing 12. Secured to the distal end of the shaft 16, there is a collet, or chuck, 18 which is adapted to hold a cutting tool, as is conventional.

The router 10 also includes a base plate 20 having a work engaging lower surface 22. The base plate 20 is displaceable substantially vertically relative to the motor housing 12. To effect and guide such displacement, hollow guide sleeves 24 and 26 are secured to the motor housing 12 and guide tubes 28 and 30 are secured to the base plate 20. The guide tubes 28 and 30 are arranged for sliding movement within the guide sleeves 24 and 26, respectively, so that a constant relative orientation between the base plate 20 and the motor housing 12 is maintained while at the same time allowing the base plate 20 to be displaced relative to the motor housing 12. As is conventional, the base plate 20 and the motor housing 12 are biased away from each other. Therefore, within each of the guide sleeves 24, 26, there is a return spring (not shown) for providing a separating force.

Figure 2:
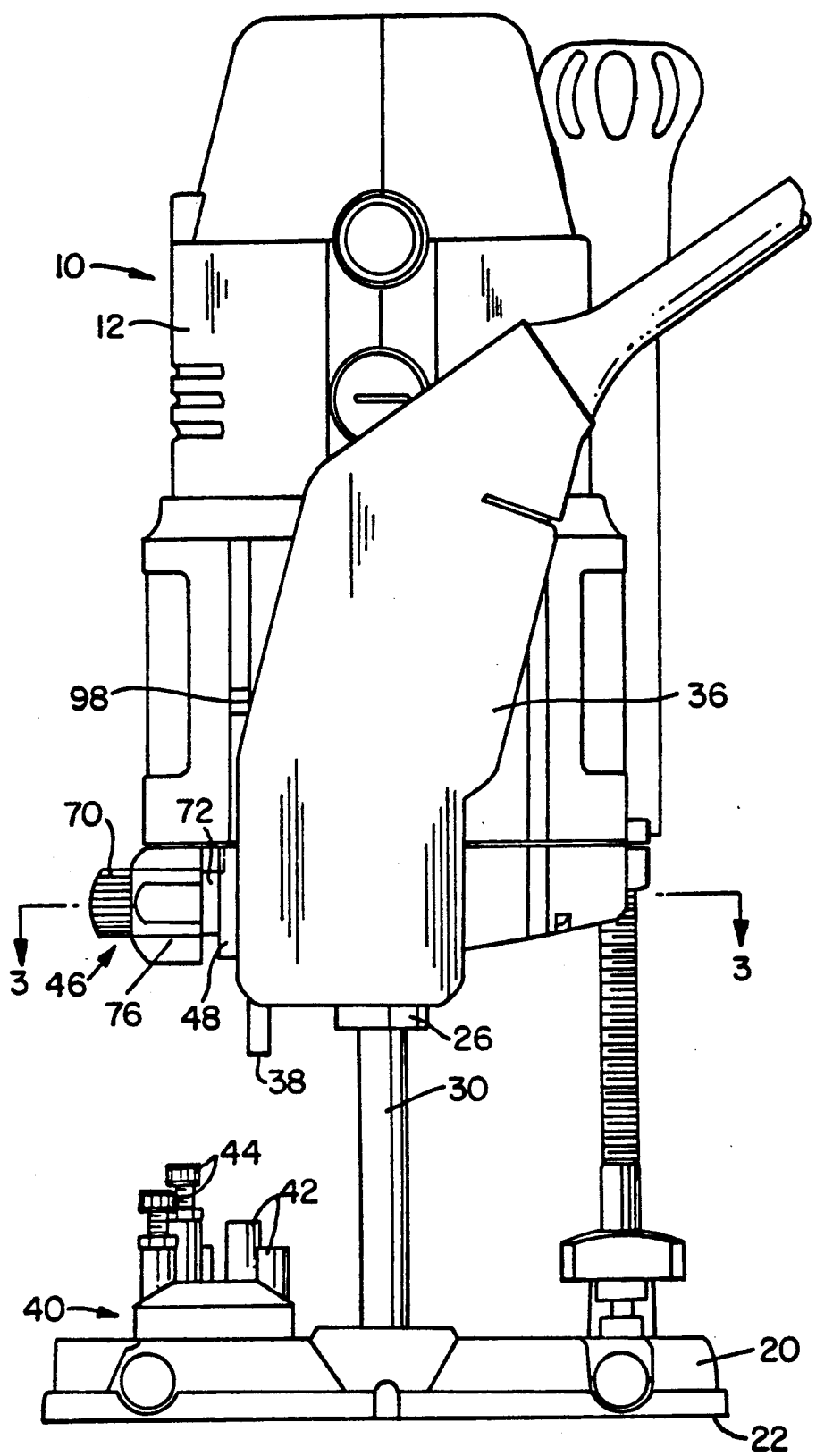
FIG. 2 is a side elevational view of the router of FIG. 1.
Figure 3:
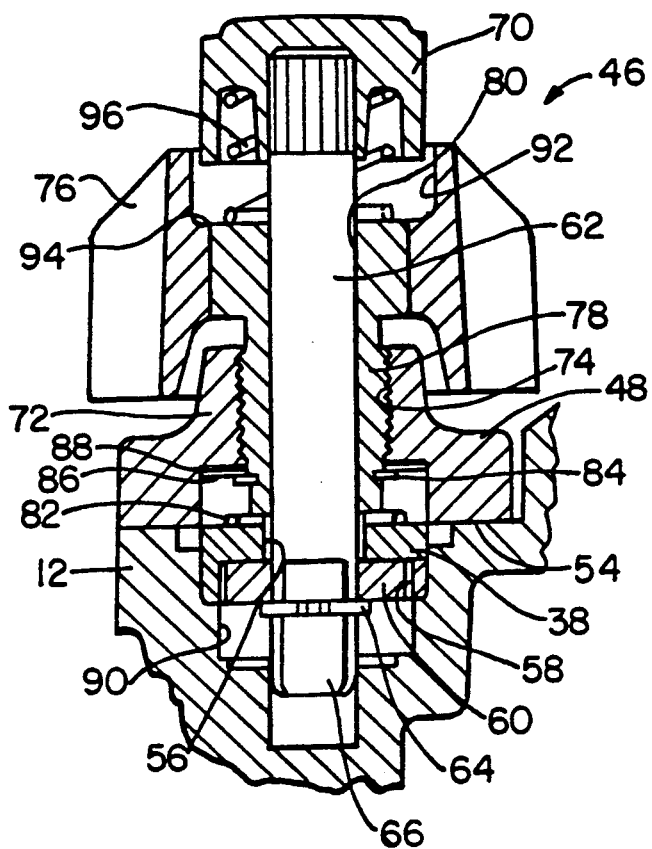
FIG. 3 is a cross sectional view taken along the line 3—3 in FIG. 2.
Figure 4:
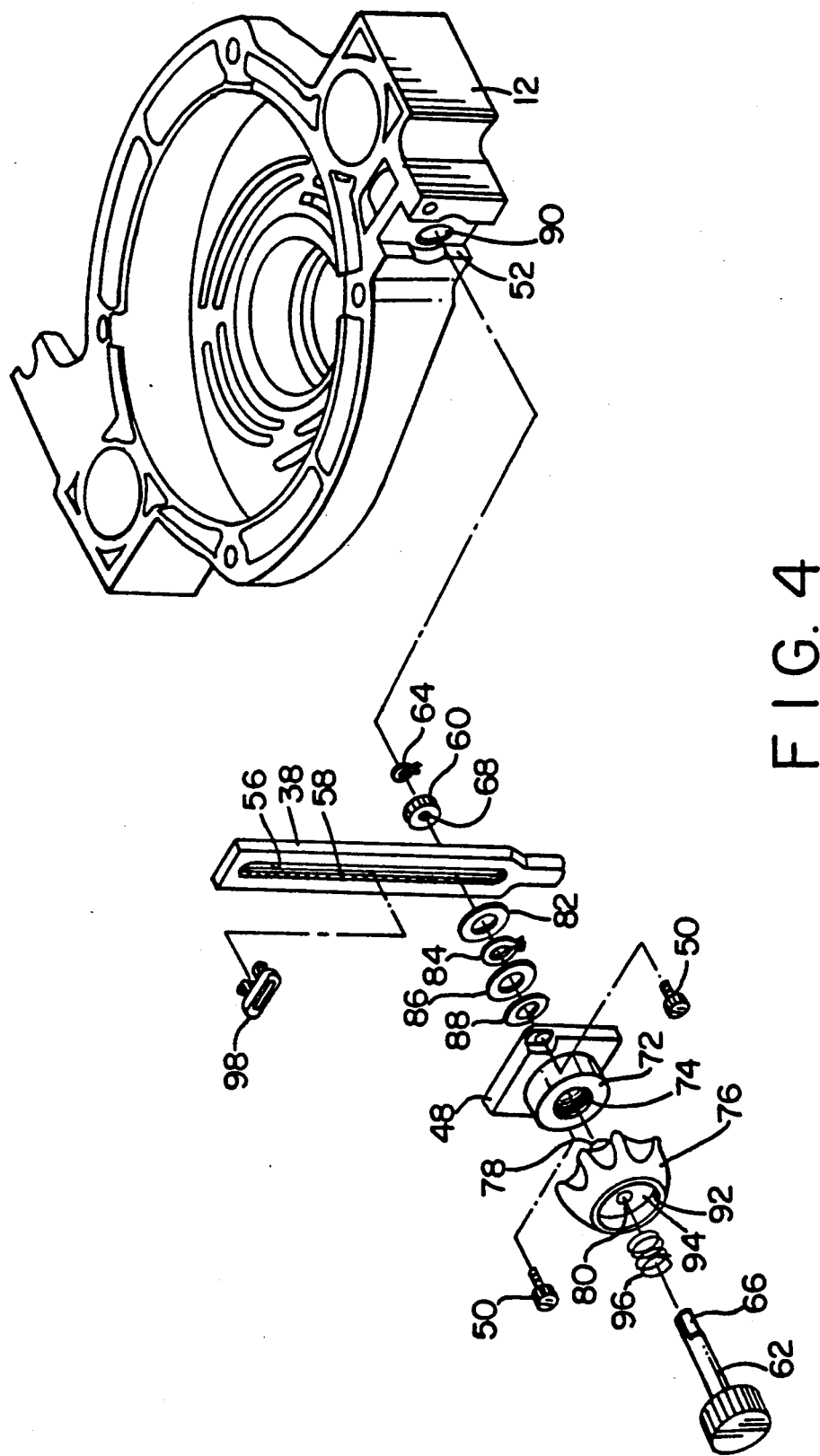
FIG. 4 is an exploded perspective view of the adjustable depth stop mechanism according to this invention.

When using a plunge type router of the type illustrated herein, the operator places the lower surface 22 of the base plate 20 on an upper surface of a workpiece. The handles 34 and 36, which are part of, or secured to, the motor housing 12, are gripped by the operator and the motor housing 12 is displaced downwardly against the force of the return spring until the cutting tool attached to the collet 18 is at the desired depth of cut in the workpiece beneath the lower surface 22. The depth of cut may be preset by a mechanism according to this invention which includes the stop bar 38 supported on the motor housing 12 for relative vertical displacement. A turret assembly 40 is rotatably mounted on the base plate 20 and includes fixed abutments 42 (FIG. 2) and adjustable abutments 44 which interfere with the lower end of the stop bar 38 to achieve the desired depth of cut. Once the desired relative displacement between the base plate 20 and the motor housing 12 is attained, that position may be secured (by structure not shown) so that the operator can guide the router 10 without being concerned with maintaining the desired relative displacement against the force of the return spring.

According to this invention, there is provided a compact and self-contained adjustable depth of cut stop mechanism, designated generally by the reference numeral 46, for controlling the position of the stop bar 38. The mechanism 46 includes a retainer plate 48 mounted to the housing 12 by screws 50. The motor housing 12 behind the retainer plate 48 is formed with a vertically oriented channel 52 which, together with the rear surface 54 of the retainer plate 48, holds the stop bar 38 and forms a guide channel for its vertical displacement on the motor housing 12.

As disclosed so far, the stop bar 38 is free to move within the channel 52 and, indeed, would fall under the influence of gravity. According to this invention, the stop bar 38 is formed with an elongated slot 56 which extends in the direction of displacement of the stop bar 38. When viewed in cross-section, the slot 56 is T-shaped, with the cross bar of the T being on the side of the stop bar 38 toward the motor housing 12. A toothed rack 58 is formed on one wall of the slot 56, specifically at an end of the cross bar of the T.

For engaging the rack 58, there is provided a pinion gear 60 which is secured to a first end of a shaft 62 by a retaining ring 64. To prevent the pinion gear 60 from rotating with respect to the shaft 62, the end of the shaft 62 on which the pinion gear 60 is mounted is flatted at 66 and the pinion gear 60 is formed with an opening 68 which is complemental to the flatted end 66 of the shaft 62. Mounted on the other end of the shaft 62, as by press fitting or the like, is an adjustment knob 70, which may be utilized by the tool operator to rotate the shaft 62, which rotates the pinion gear 60 and causes the stop bar 38 to be vertically displaced when the pinion gear 60 is engaged with the rack 58.

The retainer plate 48 is formed with a boss 72, which has a threaded through-bore 74 opening into the channel 52. To lock the stop bar 38 from inadvertent movement once it has been set to the desired depth of cut, there is provided a lock knob 76 secured to a generally cylindrical externally threaded member 78 which engages the threads of the bore 74. The member 78 has an axial through-bore 80 which contains and acts as a bearing for the shaft 62.

A washer 82 surrounds the shaft 62 between the stop bar 38 and the end of the cylindrical member 78. Accordingly, clockwise rotation of the lock knob 76, as viewed in FIG. 1, causes the cylindrical member 78 to be moved inwardly of the retainer plate 48 so as to bear against the washer 82, which in turn bears against the stop bar 38 to press the stop bar 38 against the back wall of the channel 52 and clamp it to whatever relative displacement it had been moved by means of the knob 70. To prevent inadvertent rotation of the member 76, which may be caused by vibration of the router 10, a retaining ring 84 is secured to the member 78. Surrounding the member 78 and between the retaining ring 84 and the retainer plate 48, there is a flat washer 86 and a spring washer 88. These elements provide sufficient axial force to engage the threads of the member 78 with the threads of the bore 74 so as to prevent inadvertent rotation of the member 78.

In the event that it is desired to quickly move the stop bar 38, the pinion gear 60 must be disengageable from the rack 58. Accordingly, the motor housing 12 is formed with a counterbore 90 which communicates with the guide channel 52. The counterbore 90 is stepped and has an inner region for accepting therein the end 66 of the shaft 62 and an outer region dimensioned at least as wide as the T cross bar of the slot 56 and sufficiently deep that the pinion gear 60 can be disengaged from the rack 58 by being moved into the counterbore 90. To allow for such movement, the lock knob 76 is formed with a counterbore 92 large enough to accept the knob 70 therein. However, the shaft 62 is sufficiently long that the knob 70 is spaced from the end 94 of the cylindrical member 78, which end 94 is flush with the inner surface of counterbore 92. The spacing between the inner end of the knob 70 and the end 94 of the cylindrical member 78 is sufficient such that when the knob 70 is pushed inwardly of the knob 76, the pinion gear 60 is completely disengaged from the rack 58 before the knob 70 bottoms out in the counterbore 92. To maintain the gear 60 in engagement with the rack 58, there is provided a compression spring 96 surrounding the shaft 62 between the knob 70 and the knob 76. The spring 96 bears against the knob 70 and the end 94 of the cylindrical member 78 so as to yieldably bias the pinion gear 60 into engagement with the rack 58. The biasing force of the spring 96 is easily overcome by the operator when disengagement is desired.

Assembly of the described mechanism takes place before the mechanism is installed on the motor housing 12. Thus, the knob 70 is press fit onto the shaft 62 and the knob 76 is press fit onto the cylindrical member 78. The cylindrical member 78 is then threaded into the retainer plate 48 and the spring washer 88, the flat washer 86 and the retaining ring 84 are installed. The spring 96 is then placed around the shaft 62 and the shaft 62 is inserted in the axial bore 80 of the cylindrical member 78. The washer 82 is then installed on the shaft 62 and the end 66 of the shaft 62 is then inserted through the slot 56 of the stop bar 38. The pinion gear 60 is then installed on the end 66 of the shaft 62 and the retaining ring 64 is installed to complete the assembly. Finally, the retainer plate 48 is secured to the motor housing 12 by the screws 50.

To provide a conventional zero reset indicating function, the slide member 98 is installed in the slot 56 of the stop bar 38. The slide member 98 is movable along a printed scale on the surface of the housing 12 adjacent the stop bar 38. This allows the operator to adjust the reference, or "zero", point to a more desirable position on the scale.

The stop bar 38 is so positioned on the motor housing 12 that its lower end is in interfering relationship with a selected one of the abutments 42, 44 on the turret assembly 40, for providing a depth of cut stop when the router is "plunged", as is conventional.

Accordingly, there has been disclosed an improved compact and self-contained mechanism for setting the depth of cut of a plunge type router. While a preferred embodiment of the present invention has been disclosed herein, it is understood that various modifications and adaptations to the disclosed arrangement will be apparent to those of ordinary skill in the art and it is only intended that this invention be limited by the scope of the appended claims.

I claim:

1. A plunge type router comprising:
  a motor housing with a drive motor secured therein, said drive motor having a shaft extending outwardly from the lower end of said motor housing and adapted to have a cutting tool secured thereto;

a base plate displaceable substantially vertically relative said motor housing;

means for judging the displacement of said base plate relative said motor housing;

abutment means mounted on said base plate; and depth stop means mounted on said motor housing for cooperating with said abutment means to limit the relative displacement of said base plate toward said motor housing, said depth stop means including:

a stop bar;

means for supporting said stop bar on said motor housing for vertical displacement in interfering relationship with said abutment means;

a toothed rack on said stop bar;

a pinion gear;

a shaft having first and second ends with said pinion gear secured to said shaft first end;

a knob secured to said shaft second end;

means for selectively engaging and disengaging said rack and said pinion gear;

means for rotating said pinion gear to adjust the vertical displacement of said stop bar when said rack and said pinion gear are engaged; and lock means surrounding said shaft between said pinion gear and said knob for selectively locking said stop bar in a desired position on said motor housing.

2. The router according to claim 1 wherein said stop bar supporting means includes a retainer plate secured to said motor housing, said retainer plate forming with said motor housing a guide channel for the displacement of said stop bar, said retainer plate being formed with a threaded through-bore opening into said guide channel, and said lock means includes a generally cylindrical externally threaded member engaging said retainer plate bore threads and extending into said guide channel for selectively clamping said stop bar against an opposed wall of said channel.

3. The router according to claim 2 wherein said stop bar is formed with an elongated slot extending in the direction of displacement of said stop bar, said slot being open from a side of said stop bar facing said retainer plate to a side of said stop bar facing said motor housing, said rack extending along a wall of said slot along said displacement direction, and said rotating means shaft extending through said slot.

4. The router according to claim 3 wherein said wall is stepped in a direction transverse to said displacement direction so that said slot is T-shaped when viewed in cross-section, the cross bar of the T being adjacent the motor housing, the rack being located at an end of the cross bar, the motor housing being formed with a counterbore communicating with said guide channel, said counterbore being dimensioned at least as wide as the cross bar of the T and sufficiently deep that said pinion gear can be disengaged from said rack by being moved into said counterbore, and said means for selectively engaging and disengaging said rack and said pinion gear includes means for yieldably biasing said pinion gear into engagement with said rack.

5. The router according to claim 4 wherein said biasing means includes a compression spring surrounding said rotating means shaft between said rotating means knob and said lock means, said compression spring bearing against said rotating means knob and said lock means.

6. The router according to claim 3 further including a zero reset indicating member slidably mounted in said stop bar elongated slot.

* * * * *